(12) United States Patent
Lee et al.

(10) Patent No.: US 8,169,912 B2
(45) Date of Patent: May 1, 2012

(54) SYSTEM FOR DYNAMIC BANDWIDTH ADJUSTMENT AND TRADING AMONG PEERS

(75) Inventors: Young Lee, Plano, TX (US); Linda Dunbar, Plano, TX (US); Lucy Yong, Plano, TX (US); Robert Sultan, Somers, NY (US)

(73) Assignee: Futurewei Technologies, Inc., Plano, TX (US)

( * ) Notice: Subject to any disclaimer, the term of this patent is extended or adjusted under 35 U.S.C. 154(b) by 396 days.

(21) Appl. No.: 11/469,177

(22) Filed: Aug. 31, 2006

(65) Prior Publication Data

US 2008/0056135 A1 Mar. 6, 2008

(51) Int. Cl.
*H04J 1/16* (2006.01)
(52) U.S. Cl. ........ 370/236; 370/229; 370/230; 370/235; 379/221.07; 375/240
(58) Field of Classification Search .................. 370/437, 370/462; 709/223, 225, 226; 375/240; 379/221
See application file for complete search history.

(56) References Cited

U.S. PATENT DOCUMENTS

| 6,381,244 | B1 * | 4/2002 | Nishimura et al. ...... 370/395.21 |
| 6,738,819 | B1 | 5/2004 | Li et al. |
| 6,904,265 | B1 * | 6/2005 | Valdivia et al. .............. 455/12.1 |
| 6,967,921 | B1 | 11/2005 | Levy et al. |
| 2002/0133589 | A1 * | 9/2002 | Gubbi et al. .................. 709/225 |
| 2003/0179752 | A1 * | 9/2003 | Grass ........................... 370/394 |
| 2004/0042406 | A1 * | 3/2004 | Wu et al. ....................... 370/238 |
| 2004/0111308 | A1 | 6/2004 | Yakov |
| 2004/0228278 | A1 | 11/2004 | Bruckman et al. |
| 2005/0080858 | A1 * | 4/2005 | Pessach ....................... 709/206 |
| 2005/0254519 | A1 | 11/2005 | Beukema et al. |
| 2006/0127091 | A1 * | 6/2006 | Yoo et al. ....................... 398/69 |
| 2007/0092251 | A1 * | 4/2007 | Bouda et al. .................... 398/72 |

FOREIGN PATENT DOCUMENTS

| CN | 1767692 A | 5/2006 |
| EP | 0847220 A2 | 10/1998 |
| WO | 0117182 A1 | 3/2001 |

OTHER PUBLICATIONS

Simple Network Management Protocol. Aug. 28, 2005. http://web.archive.org/web/20050828063512/http://en.wikipedia.org/wiki/Simple_Network_Management_Protocol.*
Foreign Communication From a Related Counterpart Application—International Search Report and Written Opinion, PCT/CN2007/070586, Nov. 1, 2007, 6 pages.
Foreign communication from a counterpart application—European application 07801012.1, Office Action dated Oct. 7, 2009, 6 pages.

(Continued)

*Primary Examiner* — Hassan Kizou
*Assistant Examiner* — Ashil Farahmand
(74) *Attorney, Agent, or Firm* — Conley Rose, P.C.; Grant Rodolph

(57) ABSTRACT

A system is disclosed, that provides dynamic bandwidth sharing among a plurality of client nodes, which share network link resources in a communication network. Upon receipt of a bandwidth adjustment request from a requesting client node, the system adjusts bandwidth when network link capacity meets the bandwidth adjustment request, or when total amount of bandwidth offered to trade by any peers of the requesting client node meets the bandwidth adjustment request.

22 Claims, 3 Drawing Sheets

OTHER PUBLICATIONS

Foreign communication from a counterpart application—European application 07801012.1, Office Action dated Jun. 9, 2010, 7 pages.
Foreign communication from a counterpart application, European application 07801012.1, Summons to Attend Oral Proceedings, dated Mar. 1, 2011.

Foreign Communication From a Related Counterpart Application, Chinese Application 200780031932.0, Partial Translation of Chinese Office Action dated Jun. 15, 2011, 6 pages.
Foreign communication from a related counterpart application—European Search Report, 07801012.1, May 8, 2009, 10 pages.

* cited by examiner

SYSTEM FOR DYNAMIC BANDWIDTH ADJUSTMENT AND TRADING AMONG PEERS

TECHNICAL FIELD OF THE INVENTION

The present invention relates generally to network communications, and more particularly, to a versatile system for dynamic bandwidth adjustment and trading among client nodes sharing network link resources.

BACKGROUND OF THE INVENTION

Automatically Switched Optical Network (ASON)/Generalized Multi-protocol Label Switching (GMPLS) protocols are commonly used to set up point to point paths, or to dynamically adjust (increase/decrease) bandwidth of point to point paths in a Connection-Oriented Packet Service (COPS) environment. However, in a Connectionless Packet Service (CLPS) application, it is not required that a connection be established between a sender and receiver, and there is lack of mechanism in conventional systems that allows for dynamic bandwidth adjustment among client nodes.

In a conventional aggregation network (100) with a shared link, illustrated in FIG. 1, each client is connected to network (100) via an access port, such as port (131), (132), (133), (134), (135) and (136). All access port traffic is aggregated to a network node (104) via network nodes (112), (114), (116), (118) and (120), and then routed to core node/switch (102) via network node (104). In this topology, all access ports (131)-(136) share bandwidth on trunk (106) to core node/switch (102).

A conventional practice for network bandwidth control involves limiting ingress rate at each access port to be under certain Committed Information Rate (CIR), such as CIR1-CIR6 associated with each access port illustrated in FIG. 1. However, there are instances where some ports may need higher bandwidth only for some period of time. Under conventional practices, those ports may have to acquire the maximum bandwidth they may possibly utilize, even though they may actually only need high bandwidth within a small time window. In these instances, conventional practices lack flexibility and lower efficiency in bandwidth utilization.

Therefore, there is a need to provide a dynamic bandwidth sharing capability among clients that share network link resources, and to improve bandwidth sharing flexibility and efficiency.

SUMMARY OF THE INVENTION

The present invention discloses a system, comprising various constructs and methods, for dynamic bandwidth adjustment or trading among client ports that share network link resources in a communication network. Upon receipt of a bandwidth adjustment request from a client, the present system determines request acceptability using network link capacity. If network link capacity meets the bandwidth adjustment request, the present system adjusts Committed Information Rate (CIR) of the requesting client. If network link capacity does not meet the bandwidth adjustment request, the present system attempts to acquire unused bandwidth from any other client ports to meet the bandwidth request of the requesting client, and adjusts CIR of the requesting client and any other client ports offering bandwidth for trade.

The present invention provides dynamic bandwidth sharing capabilities among clients that share network link resources, and improves bandwidth sharing flexibility and efficiency.

The present invention may provide dynamic bandwidth sharing capabilities through exchange of signaling messages in a control plane, or through a bandwidth manager in a management plane. The bandwidth trading of the present invention may be performed in either centralized or distributed fashion.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited solely to the embodiments shown, but is to be accorded the widest scope consistent with the principles and features disclosed herein.

The present invention discloses a system for dynamic bandwidth adjustment or trading among client nodes sharing network link resources. The present invention provides different mechanisms to achieve dynamic bandwidth adjustment or trading. For example, the dynamic bandwidth adjustment or trading may be performed in a control plane through exchanging signaling messages, or it may be performed in a management plane through bandwidth management.

Figure 1:
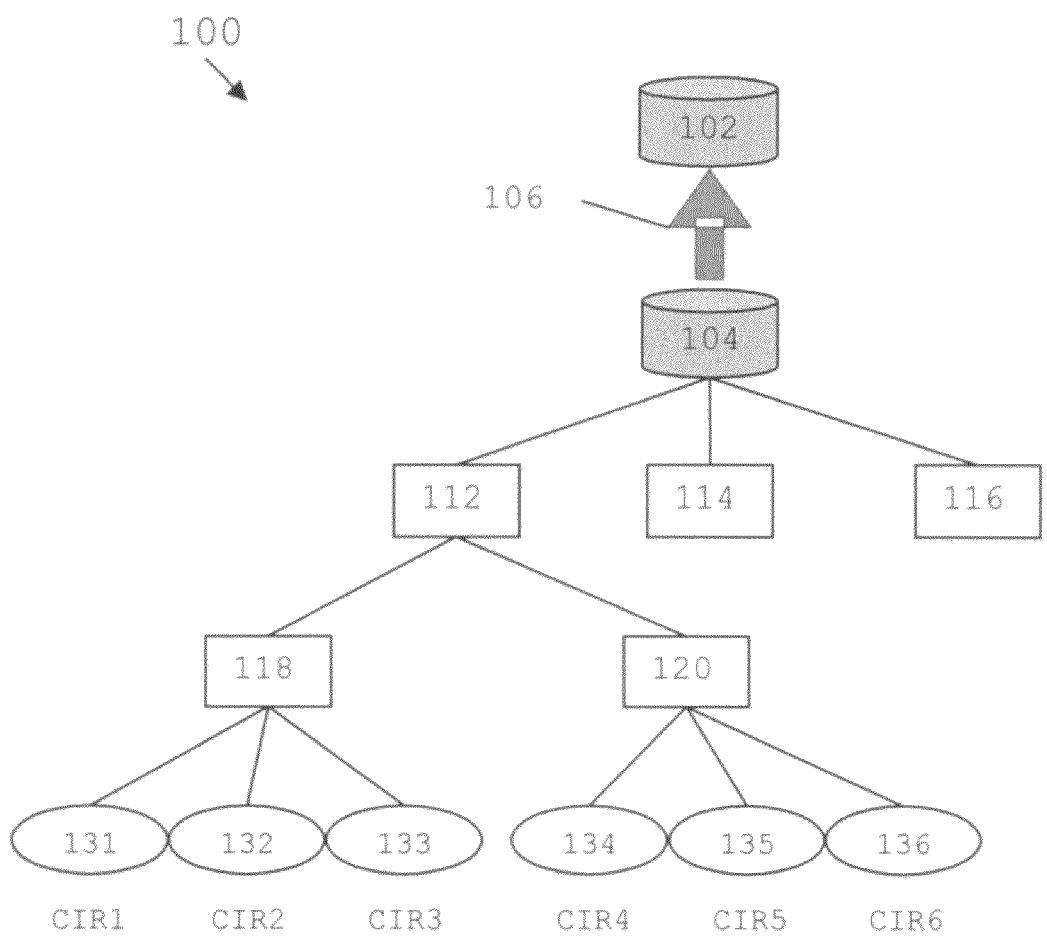
FIG. 1 depicts an aggregation network with a shared link.
Figure 2:
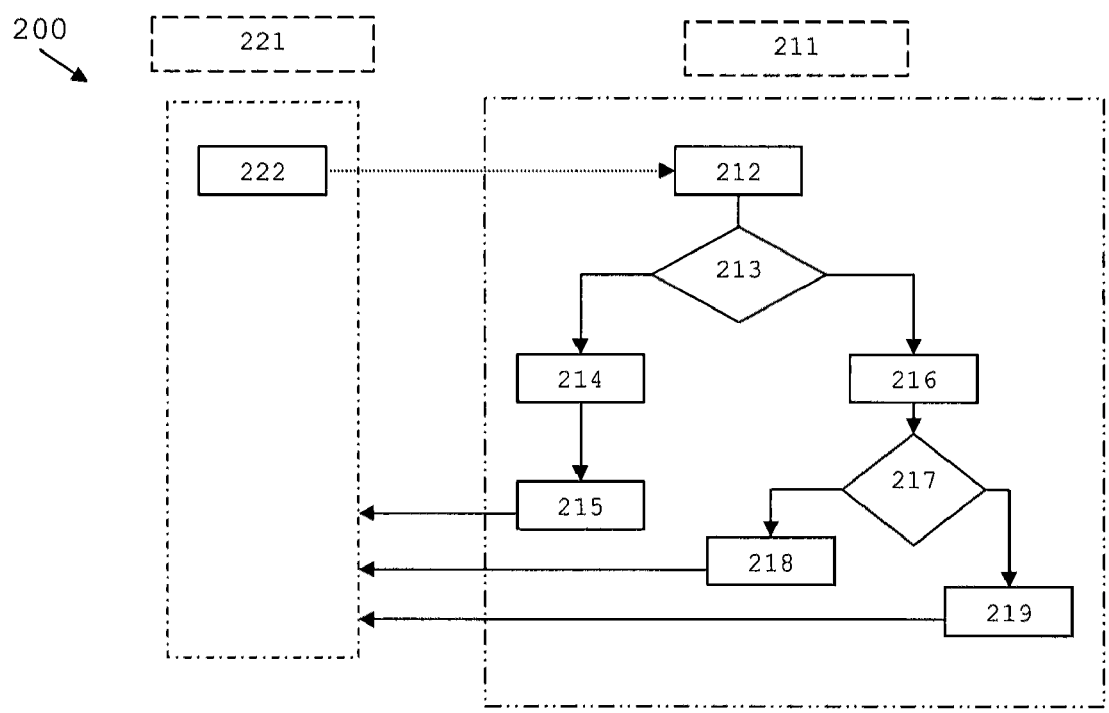
FIG. 2 depicts a flow chart illustrating operation of dynamic bandwidth adjustment and trading through exchange of signaling messages according to the present invention.

Referring now to FIG. 2, a flowchart (200) illustrates operation of dynamic bandwidth adjustment and trading, among a group of client nodes sharing network link resources, through exchange of signaling messages in accordance with the present invention.

Bandwidth adjustment may begin from step (222), when a client (221) requests bandwidth increase from a network node (211). Network node (211) may be any node in a network that has knowledge of clients sharing the network link resources. Upon receipt of bandwidth increase request from client (221) in step (212), network node (211) determines, in step (213), whether such request may be accepted or not, using network link capacity information. If network link capacity is greater than, or equal to, total updated aggregate CIR bandwidth, then the request is accepted in step (214), and network node (211) may proceed in step (215) by notifying the port of client (221) with an updated CIR level. The total updated aggregate CIR bandwidth is the total amount of CIR of all client ports that share the network link capacity, with the requesting client port's CIR adjusted as requested. The transaction may be completed when the port of client (221) confirms with the update.

If network link capacity is less than total updated aggregate CIR bandwidth, network node (211) may send a multicast message in step (216) to each of the peers (i.e., all the other ports that share network link capacity with client (221)), inquiring if any of the peers may trade unused bandwidth in response to the request from client (221) for additional bandwidth. Each port may send a reply message back to network node (211) with an amount of bandwidth offered to trade. Upon receipt of reply messages from all participating peers, network node (211) determines whether the bandwidth increase request may be honored in step (217). If the bandwidth increase request is honored, in step (218), network node (211) informs each participating peer about the bandwidth increase results. Network node (211) also sends a notification message with adjusted CIRs to all trading peers that offer traded bandwidth in step (218). Once the reservation is confirmed, both requesting client (221) and trading peers update their CIRs. If the total amount of bandwidth offer to trade doesn't meet the bandwidth increase request, network node (211) informs the result to requesting client (221) in step (219).

Figure 3:
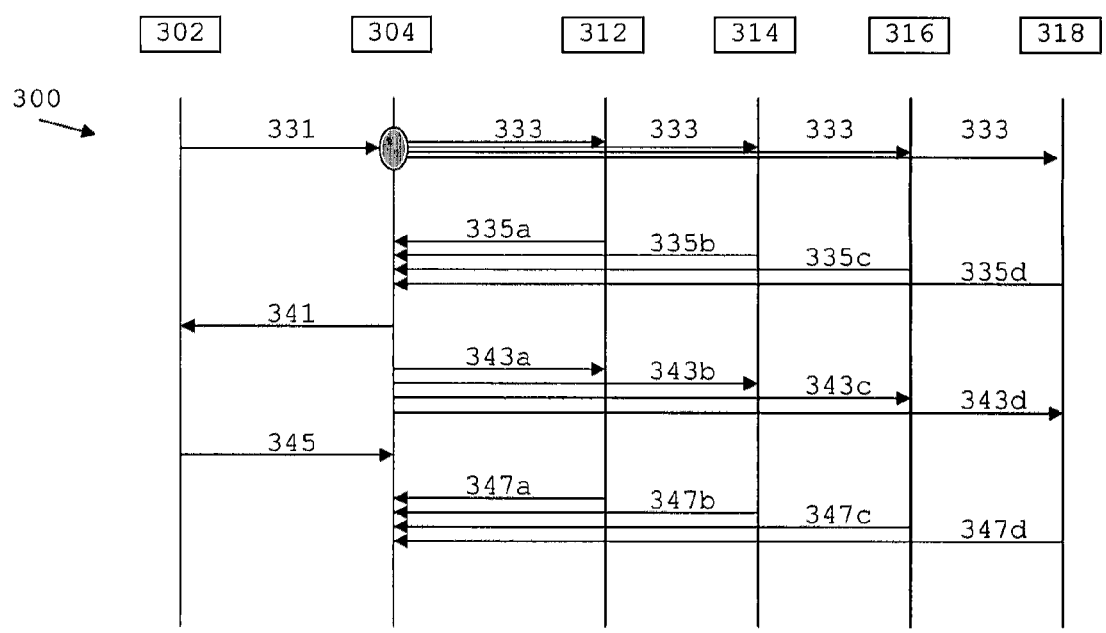
FIG. 3 depicts signaling sequences for dynamic bandwidth trading through exchange of signaling messages according to the present invention.

Reference is now made to FIG. 3, which depicts a signaling sequence diagram (300) for an embodiment where bandwidth adjustment and trading are necessary due to limited shared link capacity. A requester (302) sends a bandwidth request message to a network node (304) in step (331), requesting bandwidth increase. Network node (304) multicasts the bandwidth request to peer1 (312), peer2 (314), peer3 (316), and peerN (318), by sending a bandwidth request multicast message in step (333), inquiring whether any peer may trade unused bandwidth to requester (302). Each of the peers (i.e., peer (312), (314), (316) and (318)) responds to the inquiry of network node (304) with an amount of bandwidth each peer may give - by sending a reply message to network node (304) in steps (335a), (335b), (335c) and (335d), respectively. Upon receiving reply messages sent in step (335), if network node (304) determines that the bandwidth increase request from requester (302) may be met by the total amount of bandwidth offered by peers (312), (314), (316) and (318), then network node (304) sends a bandwidth confirmation message in step (341) to requester (302), informing requester (302) that the bandwidth request is honored. Network node (304) also sends bandwidth adjustment confirmation messages to each peer for CIR adjustment in steps (343a), (343b), (343c) and (343d), respectively. Requester (302) and peers (312), (314), (316) and (318) respond to network node (304) by sending confirmation acknowledgement messages to network node (304) in steps (345), (347a), (347b), (347c) and (347d), completing bandwidth adjustment.

With the exchange of signaling messages described above, a client's request for bandwidth adjustment is met, and bandwidth adjustment is dynamically achieved. This may be performed via a control plane through exchange of signaling messages.

Other embodiments achieve dynamic bandwidth adjustment via a management plane through a bandwidth manager. In such instances, instead of a network node, with which client ports exchange messages, a bandwidth manager may assume the role of the network node to manage dynamic bandwidth adjustment. A bandwidth manager may identify a bandwidth need from a client, determine whether the need may be met, and adjust and/or trade bandwidth among peers of the client. An interface between client ports and the bandwidth manager may be a network management interface like Simple Network Management Protocol (SNMP).

The dynamic bandwidth adjustment and trading illustrated above is centralized. That is, a network node sends a bandwidth request message to each of participating clients, and collects bandwidth information from the clients. Alternative embodiments adjust bandwidth dynamically in a distributed fashion. These alternative embodiments allow each client to come up with its own bandwidth profile information based on its historical link traffic utilization. A bandwidth profile may be a list of bandwidth utilization of a historical link in each period of time, and associated "residual" bandwidth a client is willing to "give away" to peers upon request. This bandwidth profile may be created in a distributed fashion by each client node.

Once this information is made available to a network node, the network node may not have to send a bandwidth request multi-cast message to each client node as it already has the information. Therefore, upon a bandwidth request from a client, the network node may determine new CIRs for participating clients using the bandwidth profile, and send bandwidth adjustment messages to all clients.

The present invention may be applied in, but not limited to, Connectionless Packet Service (CLPS) applications, and multi-point to multi-point traffic type. The dynamic bandwidth trading may be included in a network service provider as a service type.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of dynamic bandwidth sharing between a plurality of peer client nodes that share network link resources in a communication network comprising:

receiving, at the bandwidth management node, a bandwidth adjustment request over an optical link via a connectionless packet service from a requesting peer client node, wherein the bandwidth adjustment request specifies an amount of requested bandwidth;

multicasting, by the bandwidth management node, the bandwidth adjustment request to at least some of the peer client nodes that share network link resources with the requesting peer client node, wherein the multicast bandwidth adjustment request identifies the client node that requested additional bandwidth and is forwarded over the optical link via the connectionless packet services;

receiving, by the bandwidth management node, a response from one or more of the peer client nodes specifying at least some bandwidth offered for trade;

determining, by the bandwidth management node, whether a total bandwidth offered for trade by the peer client nodes is sufficient to satisfy the bandwidth adjustment request;

informing, by the bandwidth management node, each peer about the bandwidth adjustment results; and sending, by the bandwidth management node, a notification message with adjusted Committed Information Rates (CIRs) to all trading peers.

2. The method of claim 1, wherein the step of determining bandwidth adjustment request acceptability utilizes network link capacity information.

3. The method of claim 2, wherein if network link capacity is greater than, or equal to, total updated aggregate Committed Information Rate (CIR) bandwidth for the plurality of client nodes that share network link capacity, then the bandwidth adjustment request is accepted, and CIR of the requesting client node is adjusted.

4. The method of claim 1, wherein the step of adjusting bandwidth comprises adjusting CIR of the requesting client node.

5. The method of claim 1, wherein the total bandwidth offered for trade by the peer client nodes is sufficient to satisfy the bandwidth adjustment request, and wherein the method further comprises:
   adjusting a Committed Information Rate (CIR) of the requesting peer client node; and
   adjusting a CIR of the at least one other peer client node.

6. The method of claim 1, wherein the bandwidth management node is a centralized network node adapted to manage dynamic bandwidth sharing.

7. The method of claim 1, wherein the bandwidth management node is a centralized bandwidth manager adapted to manage dynamic bandwidth sharing.

8. The method of claim 1, wherein the bandwidth adjustment request and the multicast bandwidth adjustment request are signaling messages.

9. The method of claim 1, wherein the communication network provides multi-point to multi-point traffic.

10. The method of claim 1, wherein bandwidth request acceptability is determined using bandwidth profile information associated with each of the plurality of client nodes.

11. The method of claim 1, wherein the multicast bandwidth adjustment request specifies the amount of bandwidth requested by the requesting client node.

12. The method of claim 1, wherein the communication network provides multi-point to multi-point traffic.

13. A communication network that supports connectionless packet services, comprising:
   a bandwidth management node that communicates with, via an optical link, a plurality of peer client nodes sharing network link resource in the communication network; and
   wherein at least one peer client node sends a bandwidth adjustment request specifying an amount of requested bandwidth; and
   wherein the bandwidth management node is configured to:
   receive the bandwidth adjustment request from the requesting peer client node over the optical link;
   multicast the bandwidth adjustment request to at least some of the peer client nodes that share network resources with the requesting peer client node,
   wherein the multicast bandwidth adjustment request identifies the peer client node that is requesting additional bandwidth and is multicast over the optical link via the connectionless packet services;
   receive one or more responses from the peer client nodes specifying an amount of bandwidth offered for trade from the responding peer client node;
   determine whether the total bandwidth offered for trade by the peer client nodes is sufficient to satisfy the bandwidth adjustment request;
   inform each peer about the bandwidth adjustment results; and
   send a notification message with adjusted Committed Information Rates (CIRs) to all trading peers.

14. The communication network of claim 13, wherein the bandwidth management node is further configured to determine that a network link capacity is less than a total updated aggregate Committed Information Rate (CIR) bandwidth for the plurality of peer client nodes that share the network link capacity before multicasting the bandwidth adjustment request to the peer client nodes.

15. The system of claim 13, wherein the bandwidth management node:
   inquires with at least one peer of the requesting client node, for trading unused bandwidth to the requesting client node; and
   determines if total amount of bandwidth offered to trade by the at least one peer meets the bandwidth adjustment request.

16. The communication network of claim 13, wherein the bandwidth management node is further configured to fulfill the bandwidth adjustment request by adjusting a Committed Information Rate (CIR) of the requesting client node.

17. The communication network of claim 13, wherein the bandwidth management node is further configured to fulfill the bandwidth adjustment request by adjusting both a Committed Information Rate (CIR) of the requesting client node and a CIR of at least one other peer client node.

18. The communication network of claim 13, wherein the bandwidth adjustment request and the multicast bandwidth adjustment request are signaling messages.

19. The communication network of claim 13, wherein the bandwidth management node supports dynamic bandwidth sharing.

20. The communication network of claim 13, wherein the communication network supports connectionless packet services, and wherein the communication network provides multi-point to multi-point traffic.

21. The communication network of claim 13, wherein the multicast bandwidth adjustment request specifies the amount of bandwidth requested by the requesting client node.

22. The communication network of claim 13, wherein the bandwidth management node interfaces with the peer client nodes via a Simple Network Management Protocol.

* * * * *

UNITED STATES PATENT AND TRADEMARK OFFICE
CERTIFICATE OF CORRECTION

PATENT NO.        : 8,169,912 B2
APPLICATION NO.   : 11/469177
DATED             : May 1, 2012
INVENTOR(S)       : Young Lee et al.

Page 1 of 1

It is certified that error appears in the above-identified patent and that said Letters Patent is hereby corrected as shown below:

Column 4, line 43, claim 1, after "receiving, at" should read "a bandwidth"
Column 4, line 53, claim 1, after "the" should read "peer client node"
Column 6, line 20, claim 15, after "The" should read "communication network of claim 13"

Signed and Sealed this
Eighteenth Day of September, 2012

David J. Kappos
*Director of the United States Patent and Trademark Office*